No. 868,163. PATENTED OCT. 15, 1907.
W. E. DONNER.
BAND CUTTER AND FEEDER.
APPLICATION FILED JULY 30, 1906.

6 SHEETS—SHEET 4.

Witnesses
Grace E. Gatewood.

Inventor
William E. Donner.
F. J. Larson & Co.
Attorneys

No. 868,163. PATENTED OCT. 15, 1907.
W. E. DONNER.
BAND CUTTER AND FEEDER.
APPLICATION FILED JULY 30, 1906.

6 SHEETS—SHEET 5.

Witnesses:
Grace E. Gatewood
A. G. Caudell D.D.S.

Inventor:
William E. Donner.
F. J. Mason Neo.
Attorneys.

No. 868,163. PATENTED OCT. 15, 1907.
W. E. DONNER.
BAND CUTTER AND FEEDER.
APPLICATION FILED JULY 30, 1906.

6 SHEETS—SHEET 6.

Witnesses:
Grace E. Gatewood
A. Brandell

Inventor:
William E. Donner
By F. J. Parson & Co.
Attorneys

UNITED STATES PATENT OFFICE.

WILLIAM E. DONNER, OF DONIPHAN, NEBRASKA.

BAND-CUTTER AND FEEDER.

No. 868,163.  Specification of Letters Patent.  Patented Oct. 15, 1907.

Application filed July 30, 1906. Serial No. 328,377.

*To all whom it may concern:*

Be it known that I, WILLIAM E. DONNER, a citizen of the United States, residing at Doniphan, in the county of Hall and State of Nebraska, have invented certain new and useful Improvements in Band-Cutters and Feeders, of which the following is a specification.

This invention relates to new and useful improvements in band cutters and feeders for threshing machines, and it pertains particularly to that type of apparatus embodying a feed rake, cutters, retarders and feed regulating means.

The invention especially contemplates an apparatus of the above type in which the grain is fed from the uppermost part of the threshing machine, in order that the several related mechanisms may have the best coöperation in the performance of their functions.

The invention aims as a primary object to provide simple and efficient operating elements capable of accomplishing a maximum degree of work with a minimum expense of energy or power.

The details of construction will appear in the course of the following description, in which reference is made to the accompanying drawings, forming a part of this specification, like numerals designating like parts throughout the several parts therein.

Figure 1:
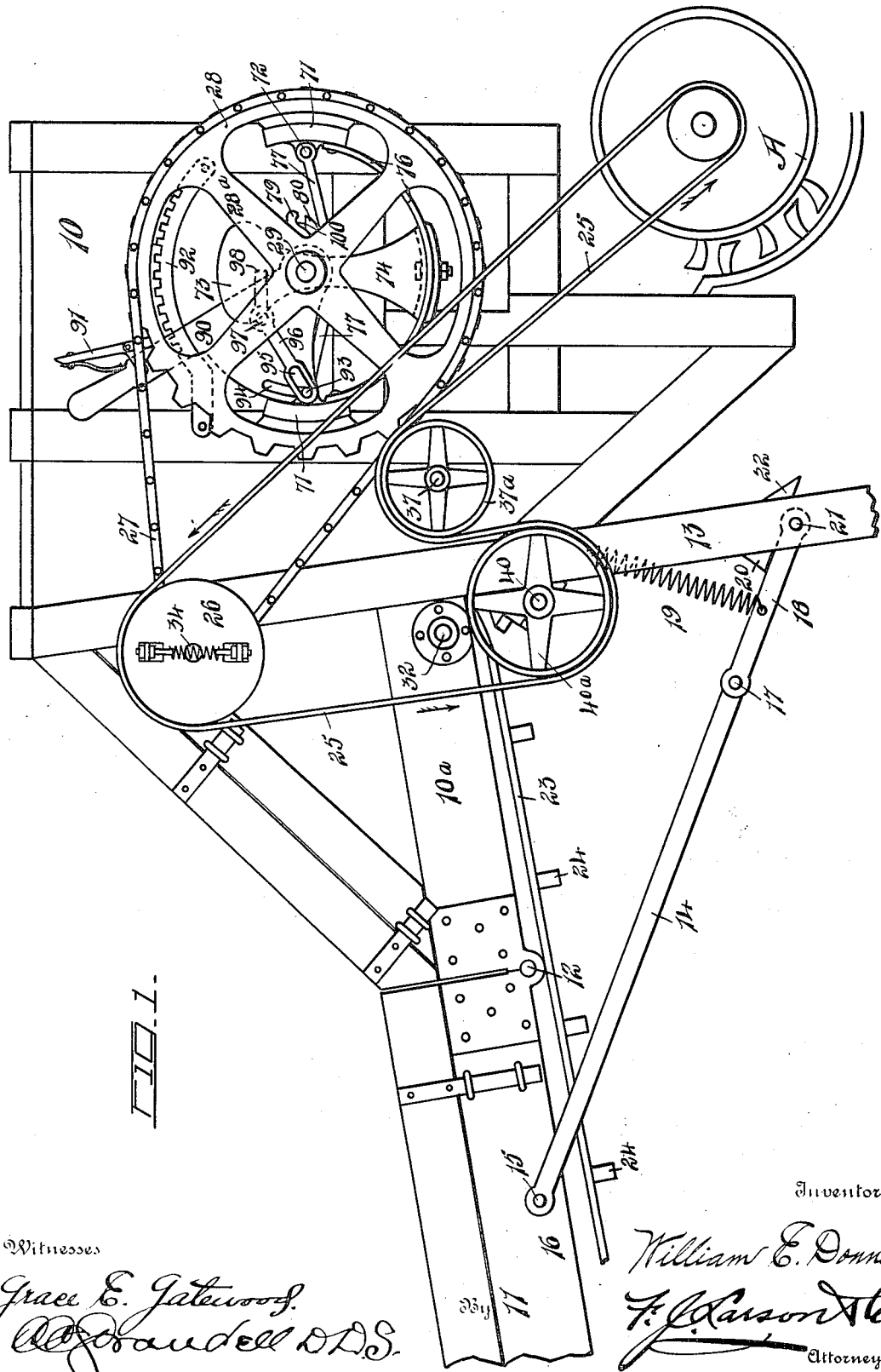
Figure 2:
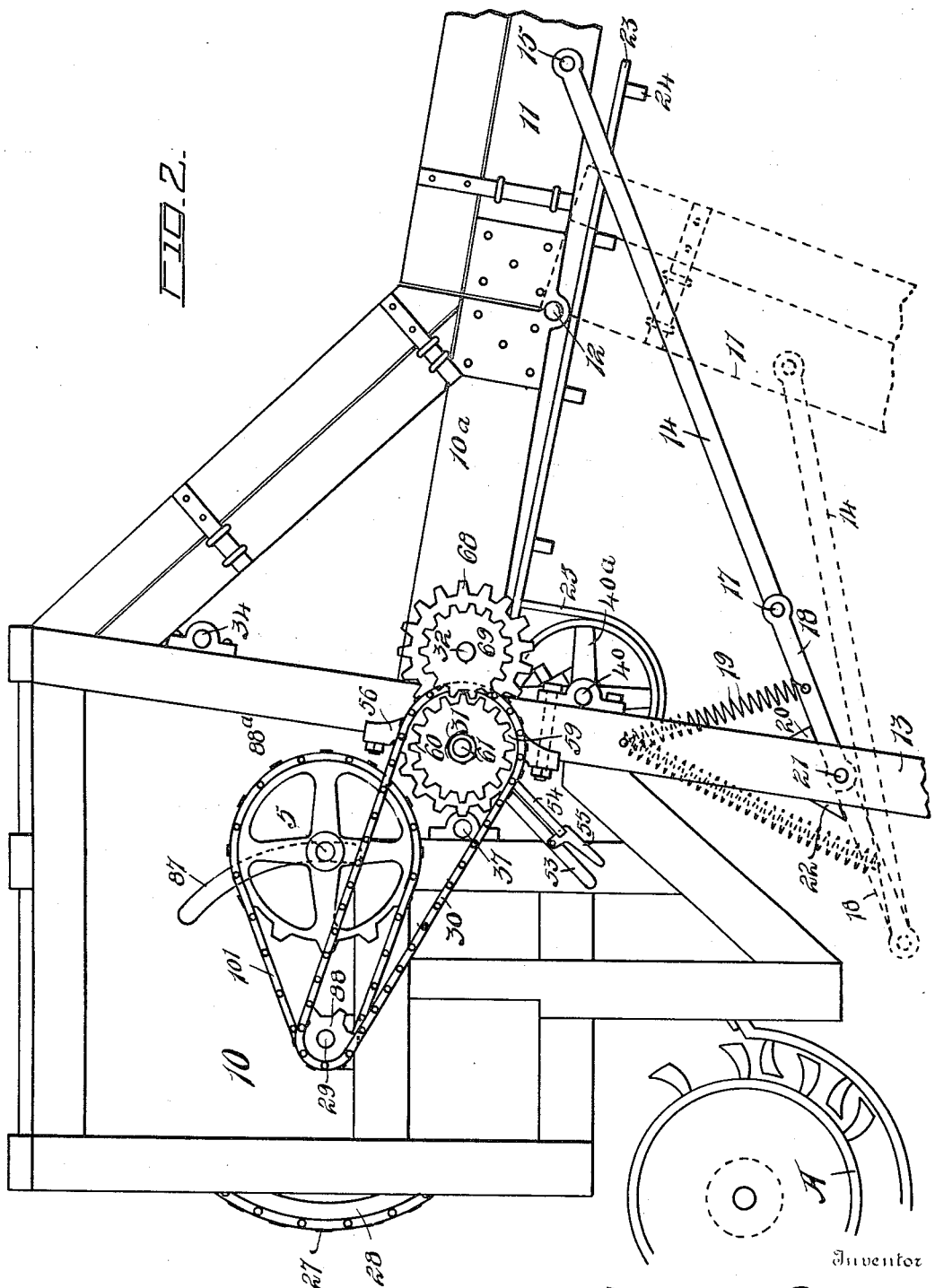
Figure 3:
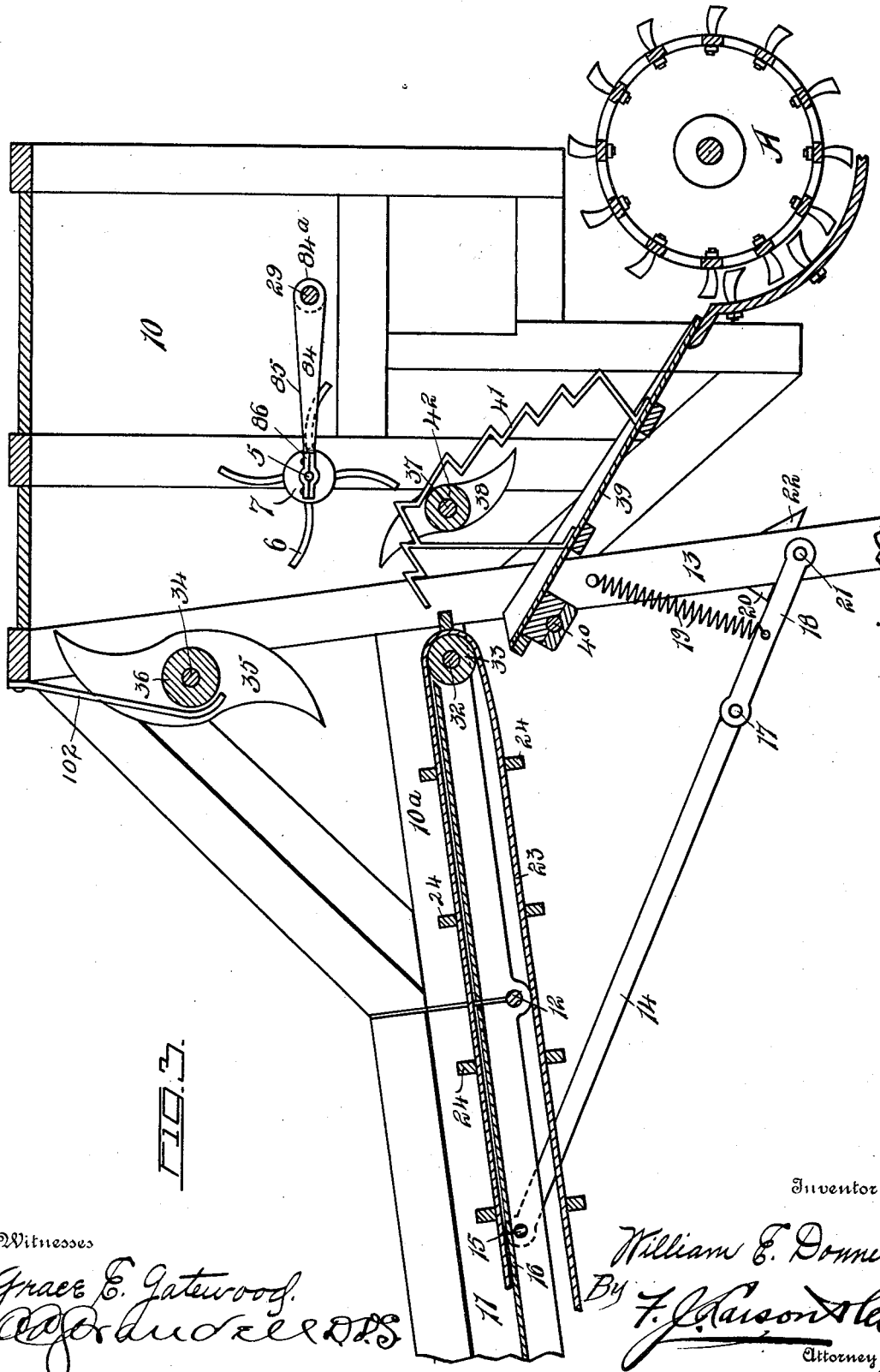
Figure 4:
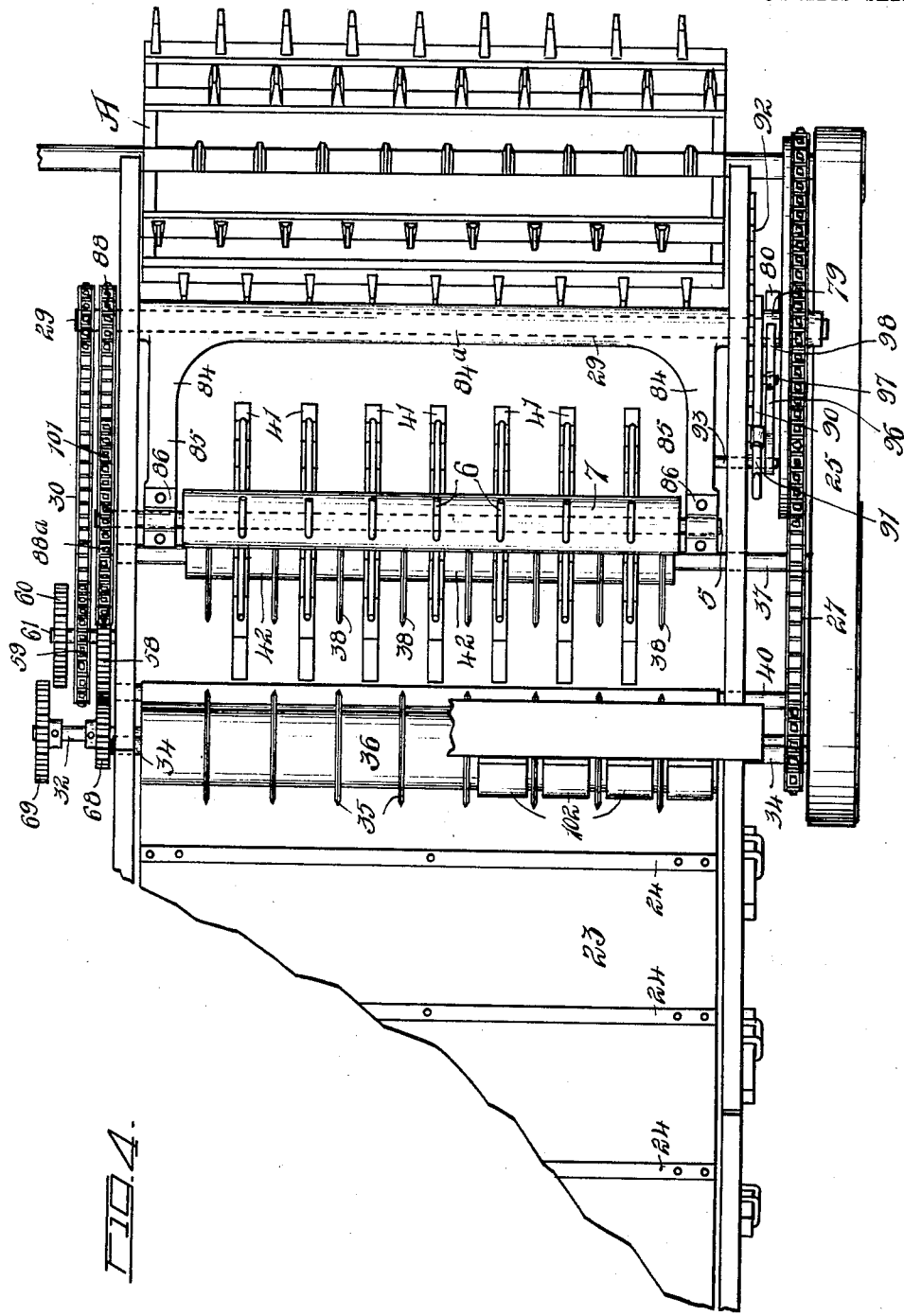
Figure 5:
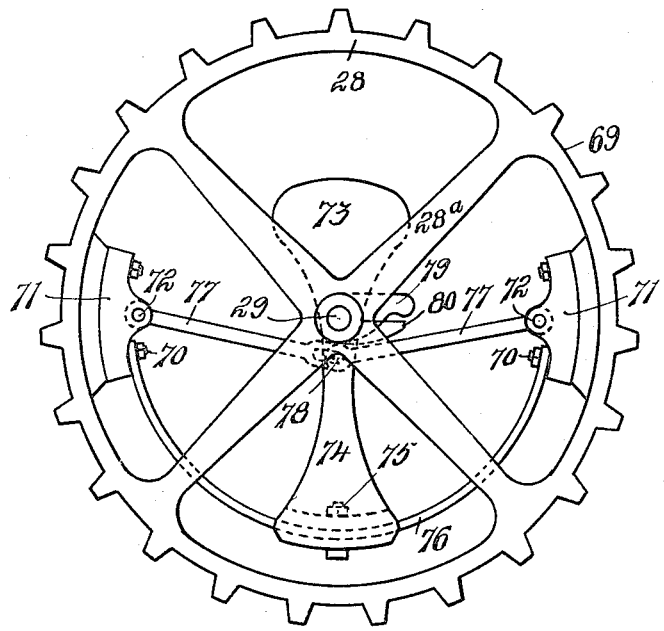
Figure 6:
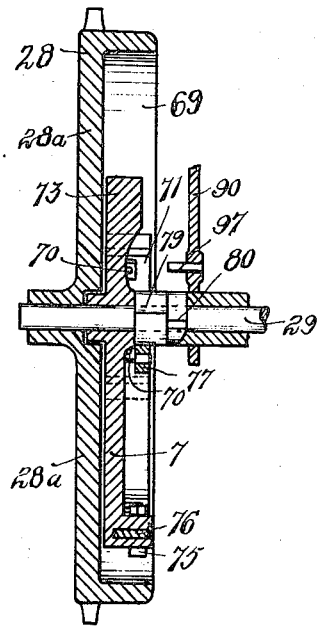
Figure 7:
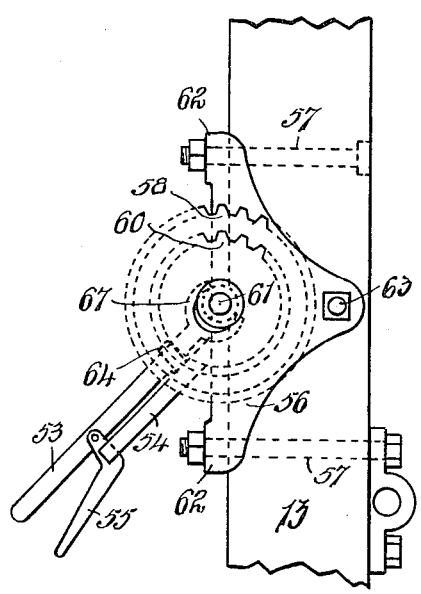
Figure 8:
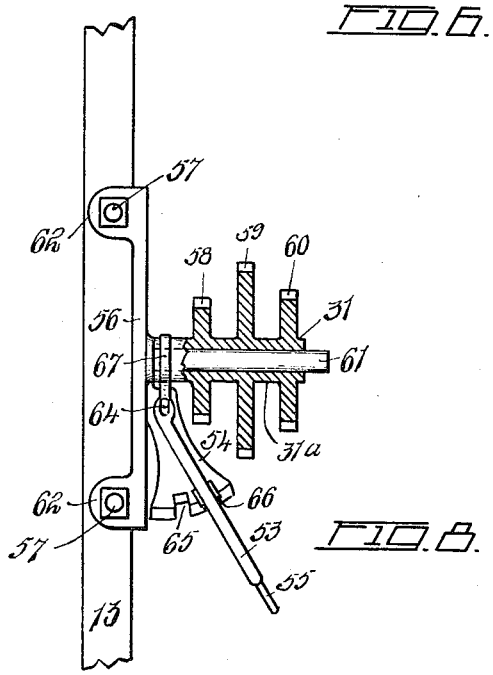
Figure 9:
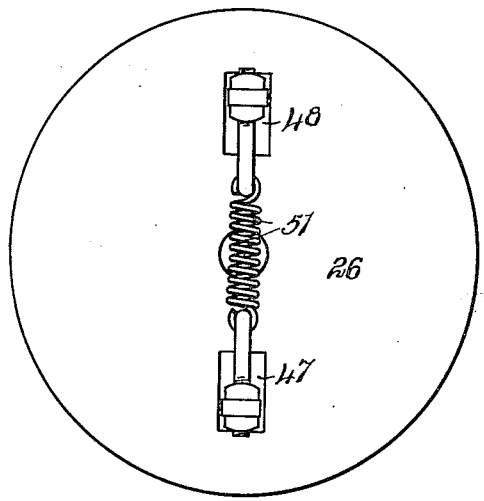
Figure 10:
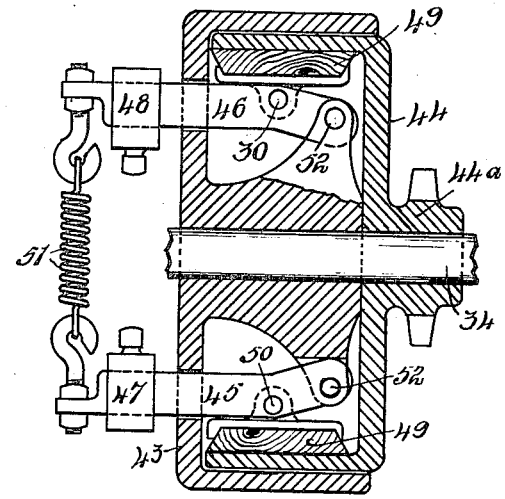
Figure 11:
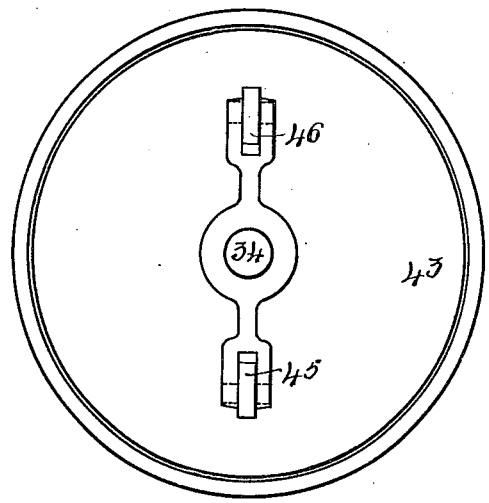
Figure 12:
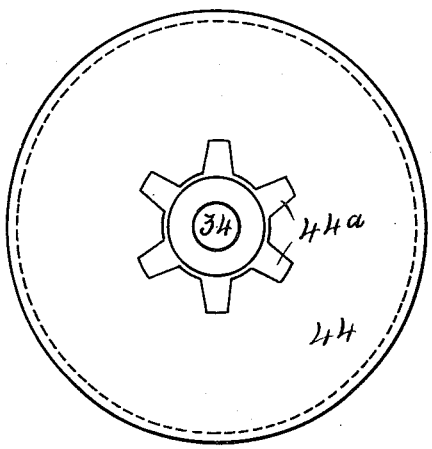
Figure 13:
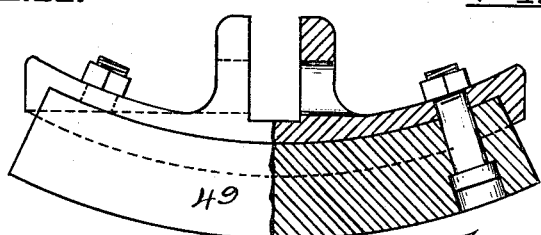

Figure 1, is a side elevation of the completed machine. Fig. 2, is a similar view of the opposite side thereof, showing in dotted lines, the folding grain carrier or feeder. Fig. 3, is a vertical longitudinal section thereof. Fig. 4, is a plan view, the cover of the machine being removed. Fig. 5, is a plan view of a novel feed governing apparatus embodied as one of the constituent elements of the invention. Fig. 6, is a vertical transverse section thereof. Fig. 7, is a side elevation of a speed changing gear employed between coöperating elements, to be hereinafter specifically referred to. Fig. 8, is a transverse section thereof. Fig. 9, is a plan view of a speed governor, comprising one of the power transmission elements of the apparatus. Fig. 10, is a vertical transverse section thereof. Fig. 11, is a plan view of a belt pulley, illustrated in Fig. 10, Fig. 12, is a plan view of a transmission pulley illustrated in Fig. 10, and, Fig. 13, is a side elevation partly in section of the friction shoes, illustrated in Fig. 10.

In the practical embodiment of my invention, I employ a frame 10, adjacent to the threshing cylinder, and secured thereto in the usual manner. The frame 10, carries a forwardly extending trough 10ª, to the end of which is hinged as at 12, so as to fold thereupon, an extension 11. The extension 11, is supported in its open or alined position by sectional braces arranged on each side thereof, each of which comprises an elongated member 14, having connection at one end with a shaft 15, extending transversely through said extension, and being pivoted at its other end as at 17, to a member 18, in turn pivoted to the front bar 13, of the frame 10, as at 21. For the purpose of maintaining the bars 14, and 18, in either extended or folded position, a retractile coil spring 19, is provided, and the movement of said sectional braces in either direction is restricted by forward and rearward stops 20, and 22, carried by the bar 13, and which positively engage the bar 18.

A movable conveyer is disposed within the trough section 11, and 10ª, and comprises an endless apron 23, provided with cleats 24, arranged at regular intervals as in the ordinary construction. As shown in Fig. 1, motion is transmitted to the apron 23, by means of a belt 25, moving in the direction of the arrow and driven from the threshing cylinder A. The belt 25, serves to drive the appurtenant parts of the apparatus, and to this end is trained over a pulley 37ª, carried by a prime band cutter shaft 37, over an idle pulley 40ª, carried by a transverse shaft 40, and over the driving element of the speed regulator 26, from which the feed governor is driven. The apron 23, and the retarder shaft 5, are in turn driven from the main shaft 29, of the feed governor 28.

The construction and arrangement of the speed regulator 26, are clearly illustrated in Fig. 10. As shown the movable elements are mounted upon the auxiliary band cutter shaft 34, and comprise a cup-shape driving pulley 43, and a similarly constructed transmission pulley 44 inclosed within the pulley 43, and driven therefrom by displaceable connections embodying friction shoes 49, pivotally carried as at 50, upon arms 45, and 46, in turn having pivotal connection at their ends as at 52, with the enlarged hub of the pulley 43. The arms 45, and 46, project through the flat side of the pulley 43, and are provided at their ends with tensioning or regulating means for controlling the outward movement thereof under centrifugal action, which means comprise a retractile coil spring 51, suitably connected thereto and adjustably movable weights 47, and 48. The operation of the speed regulator is upon well-known principles, the arms 45, and 46, being thrown outwardly when the speed of the threshing cylinder attains a selected degree, and in such outward movement engaging the shoes 49, with the inner circumferential surface of the pulley 44, whereby the latter is driven from the pulley 43. Normally the spring 51, tends to draw said arms together and out of engagement with the pulley 44.

The pulley 44, is formed at its hub with an integral sprocket 44ª, over which a chain 27, is trained which serves as a driving element for the feed governor 28. To this end the chain 27, passes over a sprocket 28ª, rigidly secured to a feed governor shaft 29.

The retarding mechanism comprises a horizontal series of radially extending fingers 6, as shown in Fig. 3, and which are carried upon an elongated sleeve 7, surrounding the shaft 5. The shaft 5, is in turn journaled in bearings 86, upon the ends of the arms 85, of a substantially U-shaped supporting bracket 84. The bracket 84, is provided in its rear portion with an elongated sleeve 84ª, which loosely surrounds the shaft 29. In this manner the shaft 29, serves as a pivot for the bracket 84, which is designed to rock thereon; and in its rocking movement to actuate the feed governor 28, so as to disengage or engage the mechanisms driven therefrom, in accordance with the upward movement of said bracket under the pressure of grain or the downward movement thereof to normal position by gravity or positive means provided therefor.

As previously stated the feed governor 28, embodies as prime elements the sprocket 28ª, and the shaft 29, passing loosely through the hub of said sprocket. The sprocket 28ª, is formed adjacent its teeth with an annular angularly disposed flange 69, upon the inner surface of which clutching devices carried by the shaft 29, are designed to frictionally bear, so as to form an interlocked engagement of the several parts. Mounted upon the shaft 29, to rotate therewith is a member 73, which is formed with a depending portion 74, having connection as at 75, with an arcuate leaf spring 76. The spring 76, has connection at its ends as at 70, with diametrically opposite friction shoes 71. The shoes 71, have pivotal connection as at 72, with links 77, which are pivotally and yieldably connected to one another at their adjacent ends by a pin and slot connection 78. A cam 79, is loosely mounted upon the shaft 29, adjacent the member 73, and in the same plane as the links 77.

As above intimated, the conveyer shaft 23, and the retarder shaft 5, are driven from the feed governor shaft 29. To this end a chain 101, is employed which is trained over sprockets 88, and 88ª, carried upon the shafts 29, and 5. The feed rake shaft 32, is driven from the shaft 29, by a chain 30, which actuates one element of a variable speed transmission illustrated in Figs. 2, 7, and 8, the compensating element thereof being mounted upon the shaft 32. This variable speed transmission comprises as the driving element an integral casting 31, embodying a central sleeve 31ª, a sprocket 59, and transmission pinions 58, and 60, of graduated diameters. The sleeve 31ª, is mounted upon a stub shaft 61, carried by a bracket 56, which is secured to a member 13, of the frame 10, by bolts 57, passing through angular ears 62, and by a screw 63, passing through the body of said bracket. The bracket 56, carries a quadrant 54, which is provided with notches 65, and 66. Pivotally secured to the quadrant as at 64, is a lever 53, which terminates at its upper end in a yoke 67, interfitting a groove formed in the sleeve 31ª. The lever 53, carries a pivoted dog 55, for locking engagement with the notches 65, and 66. The shaft 32, carries pinions 68, and 69, inversely graduated with respect to the pinions 58, and 60, with which they respectively are designed to mesh. The chain 30, is trained over the sprocket 59, and it will be readily apparent that the shaft 32, and the element driven therefrom will move at a speed which is controlled by the engagement of the respective pinions 58, and 68, or 60, and 69. The engagement of the above named pinions is determined by the position of casting 31, which is slid along the shaft 61, in either direction by the proper movement of the levers 53, in the well-known manner.

This cam 79, is formed with a lateral flat faced extension 80, which is designed to be engaged by suitable mechanism to trip said cam, in effecting a disengagement of the shoes 71, with the sprocket 28ª, which tripping mechanism is carried by the bracket 84. As above intimated the bracket 84, is capable of pivotal movement upon the shaft 29. This pivotal movement is accomplished initially, by manual means, which is employed to set the bracket at a selected height, and operatively, by the pressure of grain passing beneath the retarding arms 6. In this last named movement, the mechanism carried by the bracket 84, operates automatically to trip the cam 79, in the accomplishment of its function. The manual means for adjusting the position of the bracket 84, comprises a lever 90, carried upon the sleeve 84ª, and provided with a spring pressed pivoted dog 91, for engagement with a stationarily supported toothed quadrant 92 suitably secured to the frame 1. The lever 90, has pivoted thereto as at 97, an element 96, formed with an angular rearward extension 98, and a forward portion terminating in a slotted end 95. This slot 95, serves to loosely receive a laterally extending stud 93, carried by the bracket 84, and projecting through a curved slot 94, in the side wall of the housing of the apparatus. The shaft 5, upon the other side of the frame projects through a curved slot 87, and has movement therein with relation to the shaft 29. It will be readily apparent that by proper movement of the lever 90, the bracket 84, may be raised or lowered as desired. When the bracket 84, has been manually set in a selected position, as above intimated, further movement thereof is effected by the pressure of excess grain passing beneath retarders 6, which it will be remembered are carried by said bracket. When the bracket is thus lifted the extension 98, of the element 96, is depressed into the path of the flat faced extension 80, of the cam 79. It will be borne in mind that the cam 79, rests upon the link 77, and is rotated therewith about the shaft 29. But when the extension 98, is depressed, the rotation of the cam 79, is positively stopped by the extension 80, thereof, impinging the extension 98, as a detent. In this relation of parts the links 77, will ride over the curved surface of the cam 79, and will be depressed thereby at their point of pivotal connection. This action serves to draw the shoes 71, together and away from the flange 69, against the tension of the spring 76, whereby the sprocket 28, runs idle and the elements driven from the shaft 29, cease to operate. This relation of the elements is maintained until the excess grain is properly disposed of by the directly driven elements at which time the bracket 84, drops by gravity to initial position, and the several devices assume their normal operative position and relation, and the operation of the mechanism temporarily stopped in the manner described continues.

The operating parts of the apparatus comprise the conveyer 23, a series of auxiliary band cutters 38, carried upon the shaft 37, a series of primary band cutters 35, carried upon the shaft 34, stationary stripping fingers 102, severally disposed between the cutters 35, a grain pan 39, stationarily supported upon the shaft 40, and fishbacks 41, mounted upon the pan 39, and severally interposed between the cutters 38. The cutters 35 and 38, and their appurtenant elements are similar in construction. In the first instance spacing members 36, are employed, which surround the shaft 34, between said cutters and in the latter instance similarly constructed and arranged spacing members 42.

In operation, the threshing cylinder initially drives the cutters 38, until sufficient speed is obtained to actuate the speed regulator in the manner previously described, at which time the cutters 35, are driven and the shaft 34, transmits movement to the feed governor 28, from which the conveyer 23, and the retarders 6, are operated. The various elements perform their functions as will be readily apparent until an overload of grain is fed by the conveyer 23, and the pressure of the grain will raise the retarders 6, to lift the bracket 84, and actuate the feed governor as above set forth thereby the operation of the conveyer and retarders is stopped until the excess grain has been disposed of by the cutters 35, and 38, and the fishbacks 41, when the bracket 84, gravitates to normal position, and the parts once more assume their operative relation.

Having thus fully described my invention, what I claim as new and desire to secure by Letters Patent is:—

1. In a band cutter and feeder, a main operating shaft, a main gear adapted to be driven therefrom, clutch members between said shaft and said gear, a conveyer driven from said gear, a pivoted element actuated by the grain passes through the device for disengaging said clutch members from said gear, said element being adapted to return by gravity to normal position, a cam for positively engaging said clutch members to move the same out of engagement with said gear, and mechanism actuated by said movable element for tripping said cam to disengage said clutch members from said gear, said clutch members being provided with a spring for restoring the same to engagement with said gear.

2. In a band cutter and feeder, a main operating shaft, a power transmitter, a centrifugal speed clutch interposed between said power transmitter and said shaft, a driving gear, clutch members between said shaft and said driving gear, a conveyer driven from said shaft, a pivoted supporting bracket, rotary retarding arms carried thereby operated from said driving gear, means for setting said bracket at a selected point in its pivotal movement, and means actuated by said bracket in its movement under the pressure of grain for disengaging said clutch members from said driving gear.

3. In a band cutter and feeder, a main operating shaft, a power transmitter therefor, a centrifugal speed clutch between said shaft and said transmitter, a main gear, clutch members between said shaft and said main gear, a conveyer driven from said main gear, a pivoted bracket, rotary retarders carried thereby and driven from said main gear, band cutters driven from said main gear, means for setting said bracket at any selected point with relation to its pivot comprising a stationary quadrant and a toothed lever carried by said bracket and engaging said quadrant, a spring for engaging said clutch members with said main gear, flexible connections between said clutch members, a cam for engaging said flexible connections to disengage said clutch members from said main gear, and an element carried by said bracket for engaging the said cam to trip the same.

4. In a band cutter and feeder, a main operating shaft, a power transmitter therefor, a centrifugal speed clutch interposed between said transmitter and said shaft, a main gear, spring held clutch members between said shaft and said gear, a band cutter, driven from said gear, a conveyer driven from said gear, a supporting bracket, rotary retarders carried thereby and driven from said gear, a secondary band cutter driven from said transmitter, a threshing cylinder driven from said power transmitter, and means carried by said bracket and actuated therefrom upon movement of said bracket under pressure of the grain for disengaging said clutch members from said main gear and for stopping the operation of the mechanism driven from said main gear, without stopping the operation of said power transmitter and the mechanism driven therefrom.

5. In a band cutter and feeder, a main operating shaft, a main gear adapted to be driven therefrom, clutch members carried by said shaft for engagement with said gear, a spring interposed between said clutch members, a conveyer driven from said gear, a supporting bracket, rotary retarders carried thereby and driven from said gear, flexible connections between said clutch members, a cam for engagement with said flexible connections, to disengage said clutch members from said main gear against the pressure of said spring, a lever fulcrumed intermediate its ends and having its free end designed to engage said gear and loose pivotal connections between the opposite end of said lever and said supporting bracket, whereby movement of the former under pressure of the grain actuates said lever to trip said cam.

In testimony whereof I affix my signature in presence of two witnesses.

WILLIAM E. DONNER.

Witnesses:
J. W. DANGLER,
B. F. SCUDDER.